United States Patent
McKenna

(10) Patent No.: US 9,158,021 B2
(45) Date of Patent: Oct. 13, 2015

(54) METHOD FOR DETERMINING FRACTURE NETWORK VOLUME USING PASSIVE SEISMIC SIGNALS

(71) Applicant: Microseismic, Inc., Houston, TX (US)

(72) Inventor: Jonathan P. McKenna, Golden, CO (US)

(73) Assignee: Microseismic, Inc., Houston, TX (US)

( * ) Notice: Subject to any disclaimer, the term of this patent is extended or adjusted under 35 U.S.C. 154(b) by 358 days.

(21) Appl. No.: 13/757,209

(22) Filed: Feb. 1, 2013

(65) Prior Publication Data

US 2014/0216729 A1    Aug. 7, 2014

(51) Int. Cl.
*E21B 43/26*   (2006.01)
*G01V 1/42*    (2006.01)

(52) U.S. Cl.
CPC .......................................... *G01V 1/42* (2013.01)

(58) Field of Classification Search
CPC ...... E21B 43/162; E21B 43/26; E21B 47/101
USPC ............................................ 166/177.5, 308.1
See application file for complete search history.

(56) References Cited

U.S. PATENT DOCUMENTS

| | | | | |
|---|---|---|---|---|
| 4,802,144 A * | 1/1989 | Holzhausen et al. | ............ | 367/35 |
| 5,996,726 A * | 12/1999 | Sorrells et al. | ................ | 181/106 |
| 6,462,549 B1 * | 10/2002 | Curtis et al. | ................... | 324/323 |
| 6,631,783 B2 * | 10/2003 | Khan | ............................. | 181/108 |
| 6,791,901 B1 * | 9/2004 | Robertsson et al. | ............ | 367/58 |
| 7,663,970 B2 * | 2/2010 | Duncan et al. | ................... | 367/38 |
| 8,831,886 B2 * | 9/2014 | Williams | ......................... | 702/16 |
| 8,898,044 B2 * | 11/2014 | Craig | .............................. | 703/10 |
| 8,982,671 B2 * | 3/2015 | Willis et al. | ..................... | 367/145 |
| 2012/0029828 A1 | 2/2012 | Pepper et al. | | |
| 2012/0318500 A1 | 12/2012 | Urbanicic et al. | | |
| 2014/0076543 A1 | 3/2014 | Ejofodomi et al. | | |

OTHER PUBLICATIONS

International Search Report and Written Opinion, International Application PCT/US2014011194.

* cited by examiner

*Primary Examiner* — Kenneth L Thompson
(74) *Attorney, Agent, or Firm* — Richard A. Fagin

(57) ABSTRACT

A method for determining a volume of a fracture network includes detecting seismic signals deployed over an area of the subsurface during pumping of fracturing fluid into at least one wellbore drilled through the area. A hypocenter of each fracture induced by the pumping is determined using the seismic signals. A facture network and associated fracture volume is determined using the determined hypocenters and seismic moments determined from the detected seismic signals. A maximum value of a scaling factor is determined based on a subset of the hypocenters having a highest cumulative seismic moments. The scaling factor is determined by relating a pumped volume of the fracturing fluid with respect to the determined fracture volume. Dimensions of each fracture are scaled using the maximum value of the scaling factor. The fracture volumes are recalculated using the scaled dimensions.

13 Claims, 12 Drawing Sheets

$A * \Delta u = \frac{1}{K}$ Times Bigger $t^2 * t^{0.5} = \frac{1}{K}$ Times Bigger $\frac{5}{t^2} = \frac{1}{K}$ Times Bigger $C_L = \left(\frac{1}{K}\right)^{\frac{2}{5}}$   Length Scaling Factor $C_A = \left(\frac{1}{K}\right)^{\frac{4}{5}}$   Area Scaling Factor $C_{disp} = \frac{1}{C_A} = (K)^{\frac{4}{5}}$   Displacement Scaling Factor NOTE: The scaling factor can be applied to the displacement only, and all the rest of the parameters will follow, as per the previous calculation flow.

FIG. 3

METHOD FOR DETERMINING FRACTURE NETWORK VOLUME USING PASSIVE SEISMIC SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of mapping induced fractures in subsurface formations, more specifically, the disclosure relates to method for identifying volume of fractures induced, for example, by hydraulic fracturing using passive seismic signals detected above the formation in which the fractures are induced.

Passive seismic emission tomography is a technique that is used for, among other purposes, determining the hypocenter (i.e., place and time of origin) of microearthquakes resulting from formation fracturing that occurs in subsurface rock formations. Such microearthquakes may be naturally occurring or may be induced, for example, by pumping fluid into formations at sufficient pressure to cause failure, i.e., fracturing of the formation. In the latter case, it is useful to be able to determine progression of the fluid front as the fluid is pumped into the formations. One technique for performing such fluid front determination during fracture pumping is described in U.S. Pat. No. 7,663,970 issued to Duncan et al. incorporated herein by reference in its entirety. The technique described in the Duncan et al. '970 patent may be used to determine hypocenters of microseismic events (or microearthquakes) caused by failure of the subsurface rock formations as hydraulic fracturing fluid is pumped into the formations.

It is known in the art to generate maps of fracture networks induced by hydraulic fracturing from detected passive seismic signals. One such technique is described in U.S. Patent Application No. 2011/0110191 filed by Williams-Stroud, incorporated herein by reference in its entirety. Although effective at mapping most of the induced fractures in a discrete fracture network (DFN) using passive seismic signals, a large number of small fractures may not be determined using such technique or any other technique because the signals generated by the fracture events may not be detected. Thus, estimates of the total fracture volume may not correspond well with the volume of fluid pumped into subsurface formations.

What is needed is a technique that can be used to more accurately determine the total volume of fractures induced by hydraulic fracturing operations.

SUMMARY

A method according to one aspect for determining a volume of a fracture network includes detecting seismic signals deployed over an area of the subsurface during pumping of fracturing fluid into at least one wellbore drilled through the area. A hypocenter of each fracture induced by the pumping is determined using the seismic signals. A facture network and associated fracture volume is determined using the determined hypocenters and seismic moments determined from the detected seismic signals. A maximum value of a scaling factor is determined based on a subset of the hypocenters having a highest cumulative seismic moment. The scaling factor is determined by comparing a pumped volume of the fracturing with respect to the determined fracture volume. Dimensions of each fracture are scaled using the maximum value of the scaling factor. The fracture volumes are recalculated using the scaled dimensions.

Other aspects and advantages will be apparent from the description and claims which follow.

BRIEF DESCRIPTION OF THE DRAWINGS

FIG. 3 shows a basis for using a scaling factor with a fracture displacement raised to a 4/5 power.

DETAILED DESCRIPTION

Figure 1:
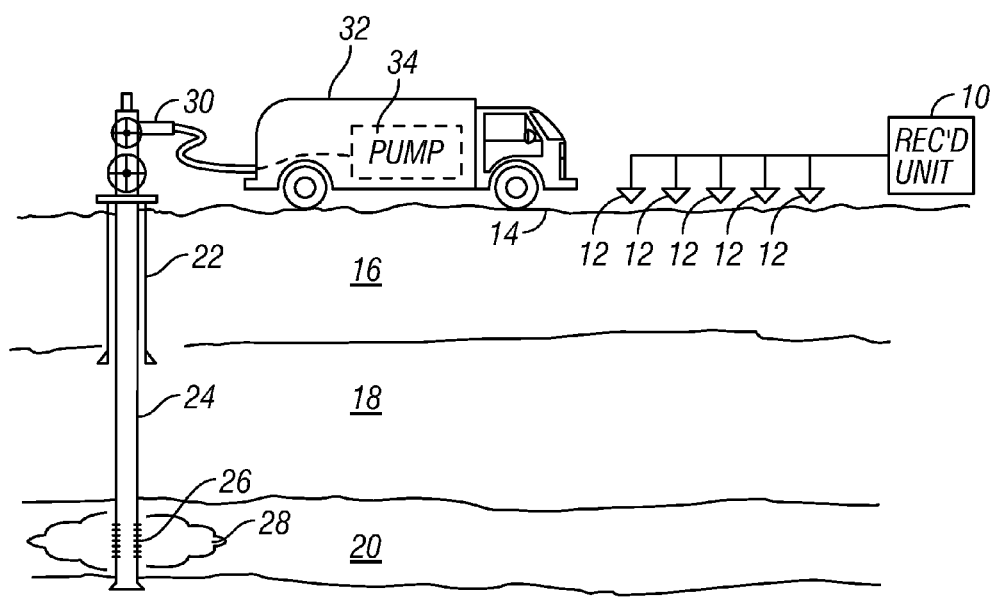
FIG. 1 shows an arrangement of seismic sensors used in a passive seismic method according to one embodiment of the invention associated with frac monitoring.

FIG. 1 shows a typical arrangement of seismic sensors as they would be used in one application of a method according to the present disclosure. The embodiment illustrated in FIG. 1 is associated with an application for passive seismic emission tomography known as "frac monitoring."

In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." The seismic sensors 12 in the present embodiment may be geophones, but may also be accelerometers or any other sensing device known in the art that is responsive to velocity, acceleration or motion of the particles of the Earth proximate the sensor. The seismic sensors may be single component (i.e., having only one direction of sensitivity) or may be multi-component (i.e., having two or more sensitive directions) The seismic sensors 12 may generate electrical or optical signals in response to the particle motion or acceleration, and such signals are ultimately coupled to a recording unit 10 for making a time-indexed recording of the signals from each sensor 12 for later interpretation by a method according to the present disclosure. In other implementations, the seismic sensors 12 may be disposed at various positions within a wellbore drilled through the subsurface formations. A particular advantage of the method of the described herein is that it provides generally useful results when the seismic sensors are disposed at or near the Earth's surface. Surface deployment of seismic sensors is relatively cost and time effective as contrasted with subsurface sensor emplacements typically needed in methods known in the art prior to the present invention.

In some embodiments, the seismic sensors 12 may be arranged in sub-groups having spacing therebetween less than about one-half the expected wavelength of seismic energy from the Earth's subsurface that is intended to be detected. Signals from all the sensors in one or more of the sub-groups may be added or summed to reduce the effects of noise in the detected signals.

In other embodiments, the seismic sensors 12 may be placed in a wellbore, either permanently for certain long-term monitoring applications, or temporarily, such as by wireline conveyance, tubing conveyance or any other sensor conveyance technique known in the art.

A wellbore 22 is shown drilled through various subsurface Earth formations 16, 18, through a hydrocarbon producing formation 20. A wellbore tubing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a frac pumping unit 32. The frac pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12. One example technique for determining the place and time of origin ("hypocenter") of each microseismic event is described in U.S. Pat. No. 7,663,970 issued to Duncan et al. and incorporated by reference as if fully set forth herein.

While the wellbore shown in FIG. 1 extends essentially vertically through the formations, it will be appreciated by those skilled in the art that the geodetic trajectory of the wellbore in other examples may be deviated from vertical, or may be drilled initially vertically and then have the trajectory changed so that the wellbore follows a selected path through the formations. Examples of such trajectory may include following the geologic layering attitude of the formations, e.g., horizontal or nearly horizontal, so that the wellbore extends for a substantial lateral distance through one or more selected formations. As will be further explained below, in certain types of wellbores, fracturing operations may be performed at selected longitudinal positions along a particular wellbore, each such operating being referred to as a fracturing "stage."

Having explained one type of passive seismic data that may be used with methods according to the invention, a method for processing such seismic data will now be explained. The seismic signals recorded from each of the sensors 12 may be processed first by certain procedures well known in the art of seismic data processing, including the summing described above, and various forms of filtering. In some embodiments, the sensors 12 may be arranged in directions substantially along a direction of propagation of acoustic energy that may be generated by the pumping unit 32, in the embodiment of FIG. 11 radially outward away from the wellhead 30. By such arrangement of the seismic sensors 12, noise from the pumping unit 32 and similar sources near the wellhead 30 may be attenuated in the seismic signals by frequency-wavenumber (fk) filtering. Other processing techniques for noise reduction and/or signal enhancement will occur to those of ordinary skill in the art.

Figure 2:
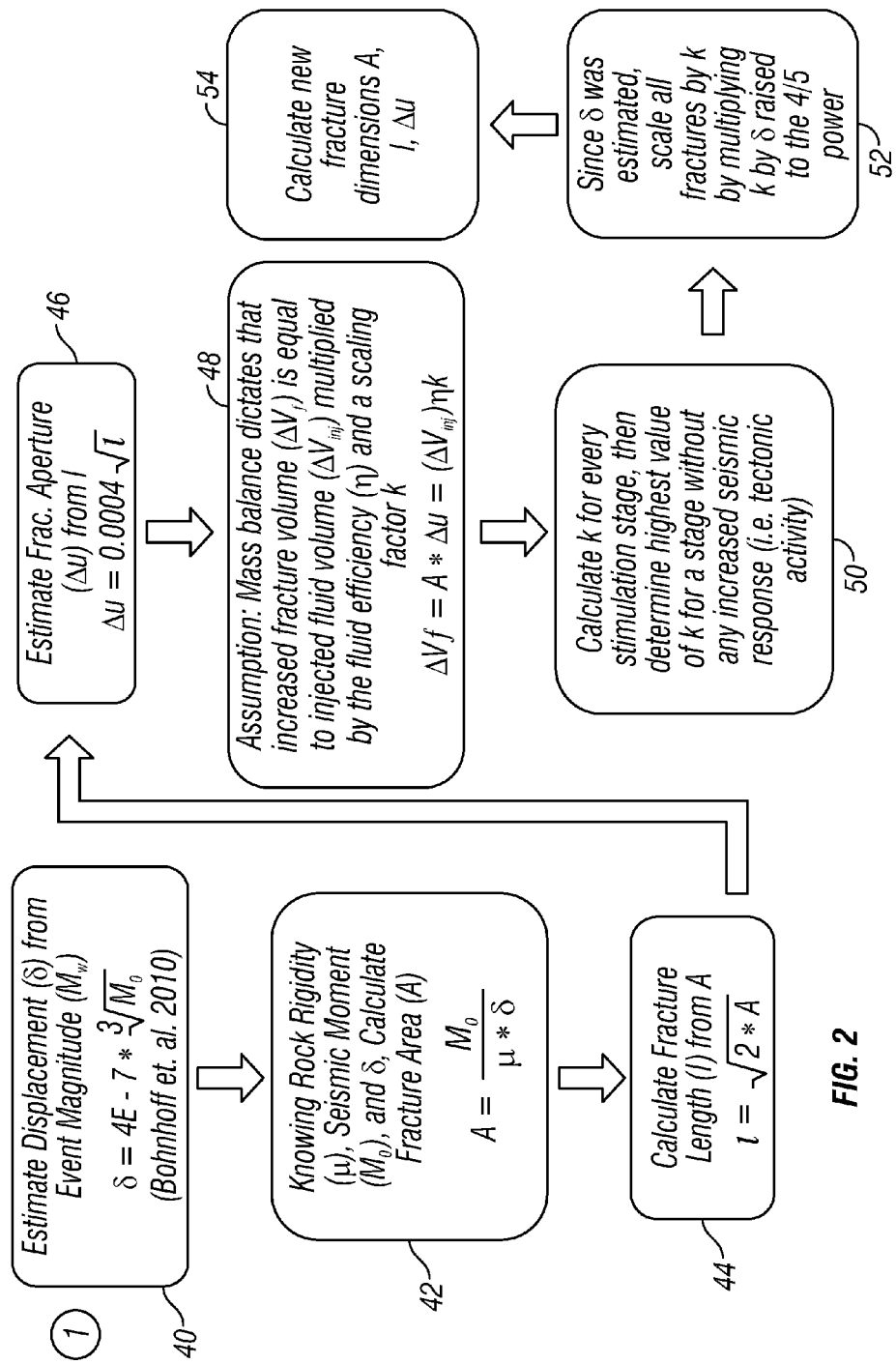
FIG. 2 shows a flow chart of an example implementation of a fracture plane orientation determination procedure.

A flow chart of an example process for determining fracture network volume is shown in FIG. 2. The example process is based on the principle of material balance, that is, the volume of fracturing fluid (multiplied by an empirical efficiency factor) pumped in any individual pumping operation should be equal to the volume of all the fractures in a fracture network created by pumping the fluid into the formations. First, a fracture network resulting from pumping the fracturing fluid may be calculated by applying the formula in 42 in FIG. 2 to each hypocenter location. A network may be determined for each pumped fracture stage (explained below). At 40 in FIG. 2, an apparent fracture displacement ($\delta$) for the identified fractures in the network may be determined from the moment (Mo). The moment (Mo) may be determined from the detected seismic signal amplitudes associated with each hypocenter determined as explained above. A non-limiting method to determine the moment is described in, Bornhoff M., Dresen G., Ellsworth W. L., and Ito H., 2009, *Passive Seismic Monitoring of Natural and Induced Earthquakes: Case Studies, Future Directions and Socio-Economic Relevance*, in Clotingh, S. and Negendank, J. (Eds.), New Frontiers in Integrated Solid Earth Sciences, Spring, New York, pp. 261-285. The fracture displacement $\delta$ may be determined from the moment Mo by the expression:

$$\delta = 4E - 7\sqrt[3]{Mo} \qquad (1)$$

as explained in the above cited Bornhoff et al. reference.

At 42, the rock rigidity $\mu$ may be determined from one of several sources. One source may be well log measurements from a well drilled through formation that is actually fractured treated, or from a nearby wellbore. Well log measurements for such purpose may include acoustic compressional and shear velocities, and density. Instruments and methods for obtaining the foregoing parameters for a particular formation are well known in the art. Rock rigidity ($\mu$) is a Lamé parameter and may be calculated by the expression:

$$\mu = V_s^2 \rho$$

where Vs is the shear wave velocity in meters per second and ρ is density in kg/m³; μ has units of Pa. By obtaining the rock rigidity, also at 42, and using the displacement determined at 40, the fracture area A associated with each hypocenter may be determined using, for example, the expression:

$$A = \frac{Mo}{\mu \times \delta} \quad (2)$$

A fracture length L may be estimated, as shown at 44, using an empirically determined aspect ratio for induced fractures, namely that the fracture length is generally twice the width of the fracture:

$$L = \sqrt{2A} \quad (3)$$

A fracture aperture Δμ may be determined, at 46, using an empirically derived expression:

$$\Delta\mu = CL^e \quad (4)$$

Such empirically derived expression is described in, Olson, J. E., 2003, *Sublinear scaling of fracture aperture versus length: an exception or the rule?*, Journal of Geophysical Research 108 (2413). doi:10.1029/2001JB000419. Empirically derived values for C may be 0.0008 and for e may be 0.5 when aperture units are in meters.

Figure 4:
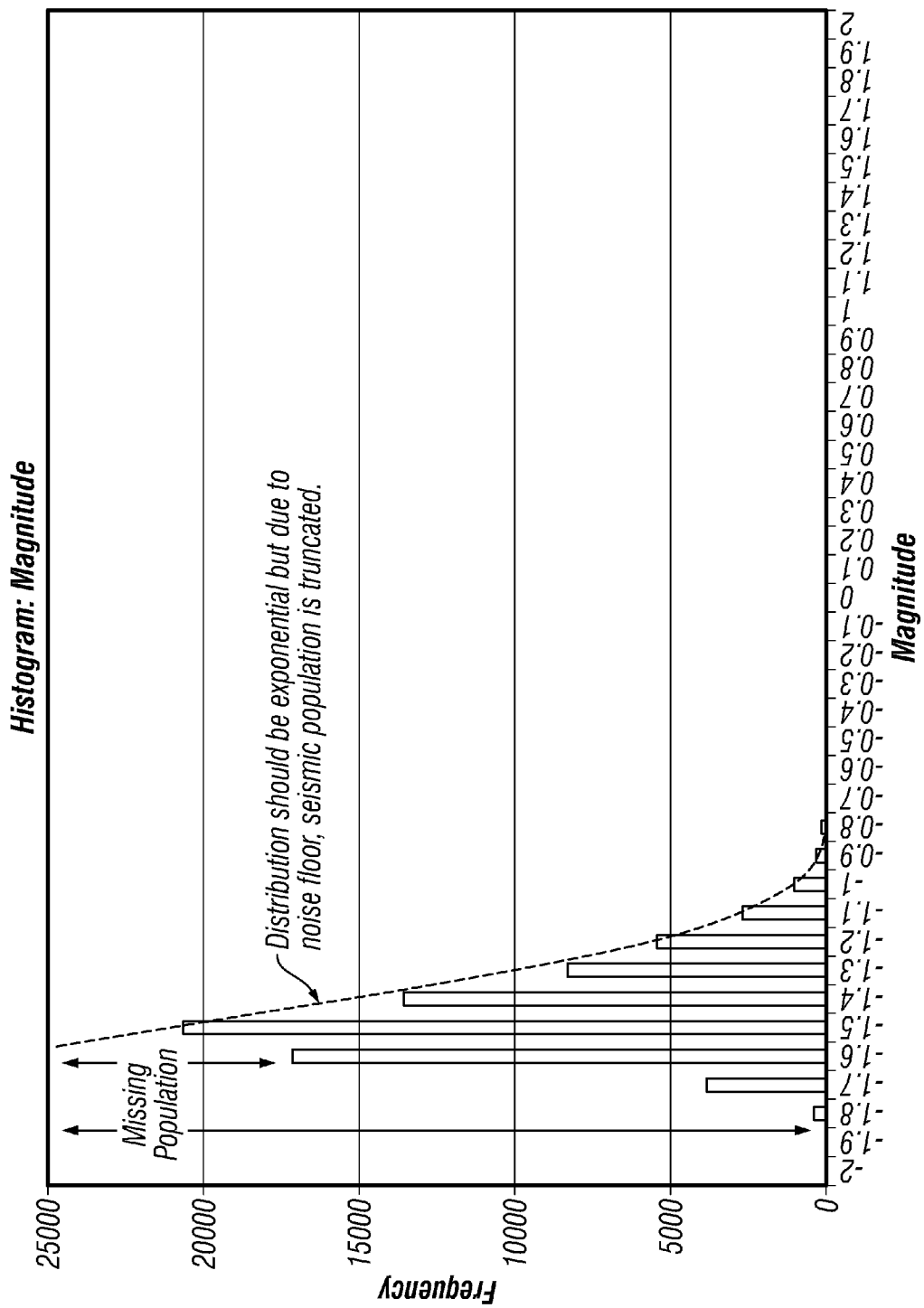
FIG. 4 shows a graph of seismic moment with respect to a number of seismic events to illustrate that small moment events may not be detected.

In the present example, as shown at 48 in FIG. 2, an assumption is made that the volume of induced fractures $\Delta V_f$ is related to the amount of fluid pumped in the fracturing operation as described with reference to FIG. 1.

$$\Delta V_f = A^* \Delta\mu = (\Delta V_{inj})\eta k \quad (5)$$

in which η is a fluid efficiency factor that accounts for portions of the pumped fracture fluid which may leak or permeate into the formation without contributing to the fracture volume. The fluid efficiency factor may be empirically determined for various types of fracture fluids and for various formations and ambient conditions such as pumped fluid pressure. In Eq. (5), k represents a scaling factor. The scaling factor is a value determined for a particular formation and fracture treatment type that accounts for the fact that not all fractures are necessarily determinable by detecting and recording seismic signals above the volume of the subsurface being examined. It is believed for purposes of the present disclosure that k is substantially the same for all stages in a multiple stage fracture treatment within a particular formation, e.g., as along several locations within a wellbore following the bedding plane of a certain subsurface formation. Referring briefly to FIG. 4, a graph of seismic event magnitude with respect to frequency of occurrence shows an exponential distribution trend which appears to peak at a magnitude related to the threshold seismic signal detection level. There may be large numbers of very small magnitude fractures that are not accounted for in the volume analysis at 40, 42 and 44 in FIG. 2 because events having magnitude below a certain noise threshold may not be detected and are thus missing from the total fracture volume calculated as explained above.

Figure 5:
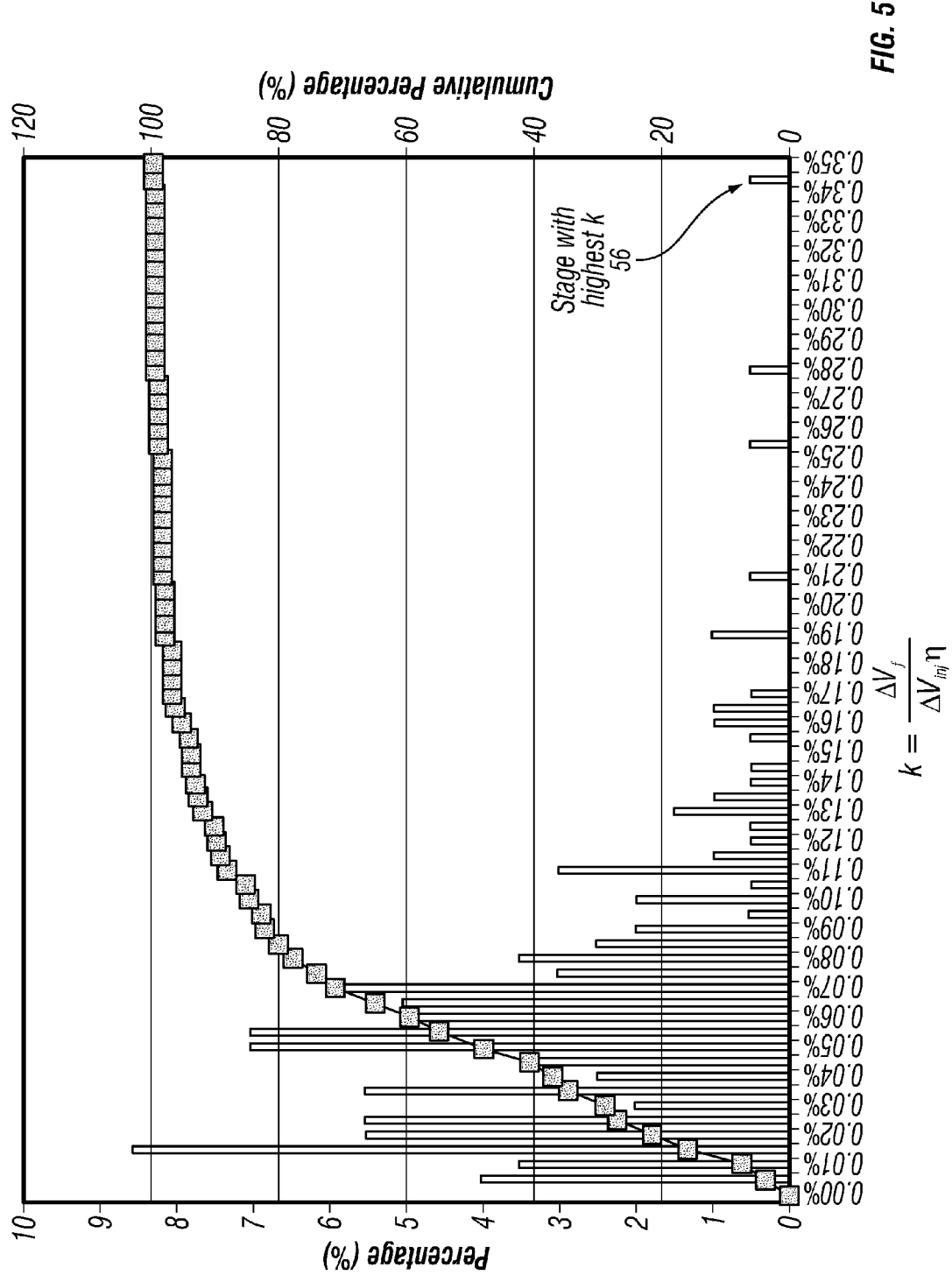
FIG. 5 shows a graph of scaling factors wherein a tectonic feature is present in the subsurface.
Figure 6B:
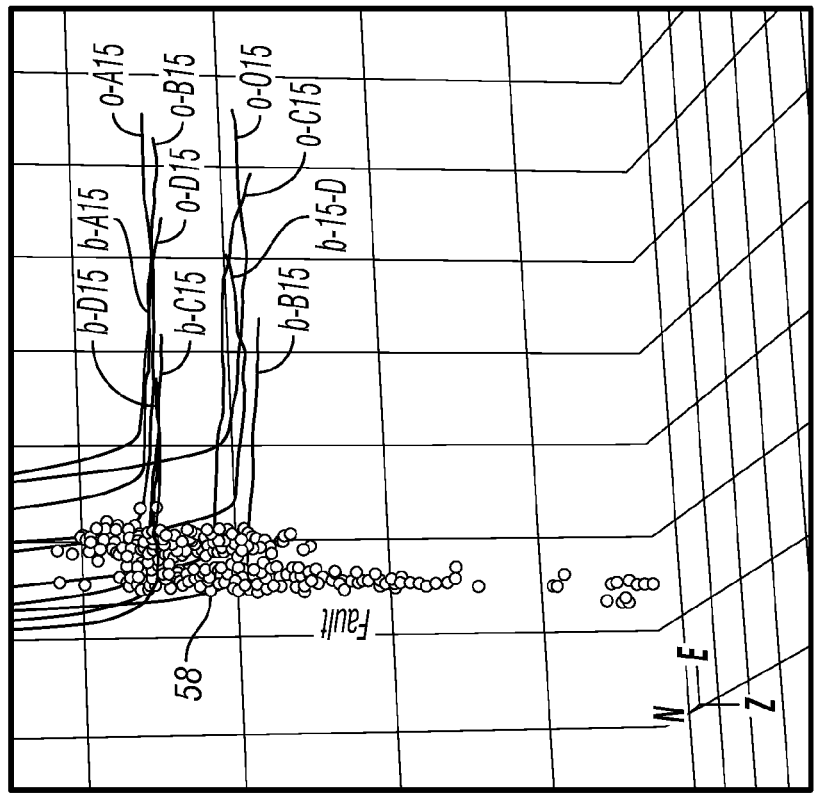
FIGS. 6A and 6B show hypocenters of fractures wherein a tectonic feature is present in the subsurface.
Figure 6A:
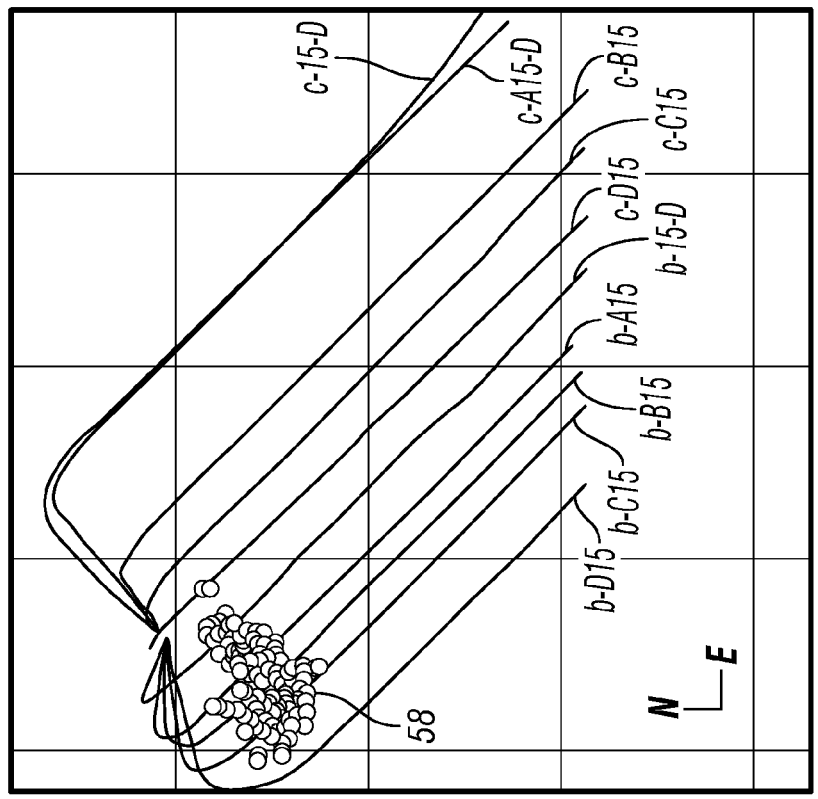

Referring once again to FIG. 2, at 50 a value of k may be determined for each fracture treatment stage pumped. In some examples, a wellbore may be drilled substantially vertically at first, and then directionally drilled so as to substantially follow the bedding plane of a selected formation. Such wellbores may be fracture treated at different intervals along the length of the wellbore, wherein each such treatment interval may be known, as explained above, as a "stage." A value of k may be determined for each such stage. At 50 the highest value of k may be determined from the k value determined from each of the stages wherein there is no associated tectonic activity or feature. A method for identifying tectonic features using microseismicity is discussed in Wessels, S. A., A. De La Pena, M. Kratz, S. Williams-Stroud, T. Jbeili, 2011, *Identifying faults and fractures in unconventional reservoirs through microseismic monitoring*, First Break, 29, pp. 99-104. Referring briefly to FIGS. 6A, which is a plan view of wellbores (represented by curves) and detected hypocenters (represented by dots) and 6B which is a vertical cross section of the same wells, it may be observed that a natural tectonic feature such as a fault, e.g., as shown at 58 contributed to very large magnitudes of detected subsurface seismic events. Such is shown graphically in FIG. 5 as values of k with respect to number of occurrences both individually for each stage (left scale) and cumulatively (right scale). The highest value of k is shown at 60 in FIG. 7. The existence of tectonic features such as shown in FIGS. 6A and 6B may be inferred initially from surveys such as surface reflection seismic and may be verified by examining the distribution of hypocenters for the existence of hypocenters that do not track the wellbore, e.g., such as shown at 58 in FIGS. 6A and 6B.

Figure 7:
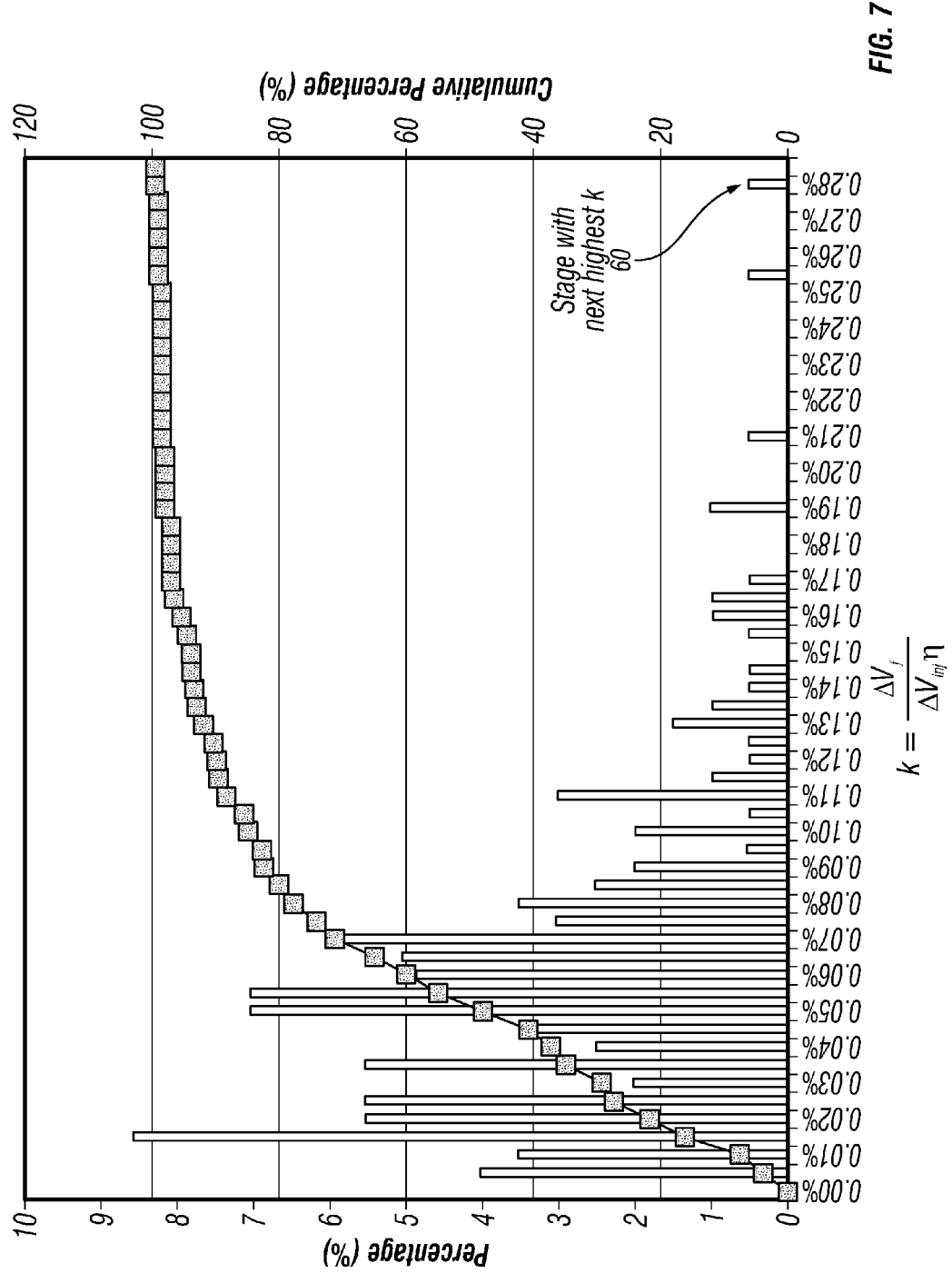
FIG. 7 shows a graph of scaling factors where no tectonic feature is present.
Figure 8B:
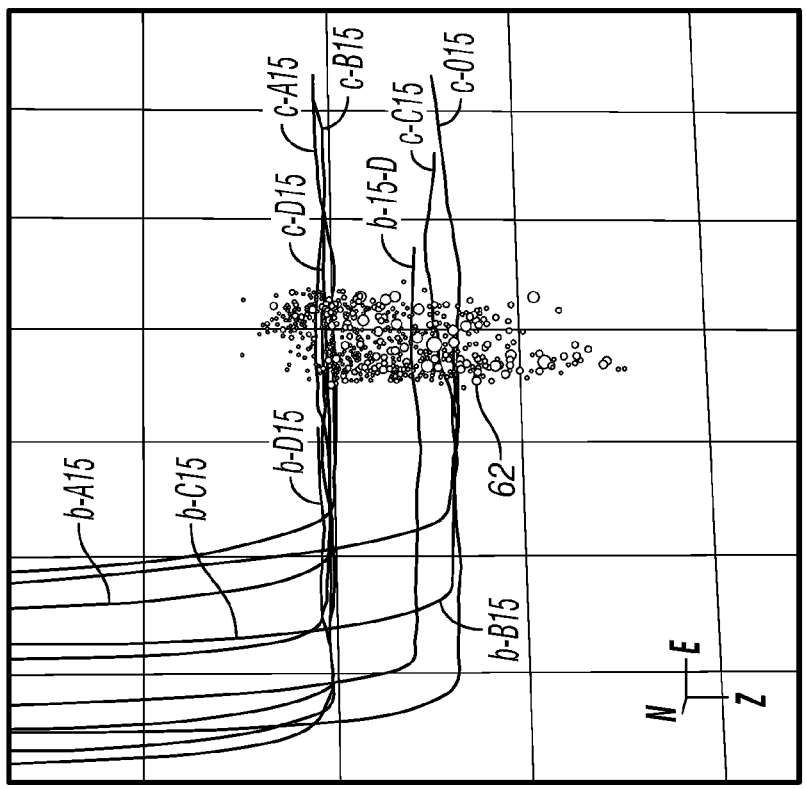
FIGS. 8A and 8B show hypocenters of fractures wherein no tectonic feature is present.
Figure 8A:
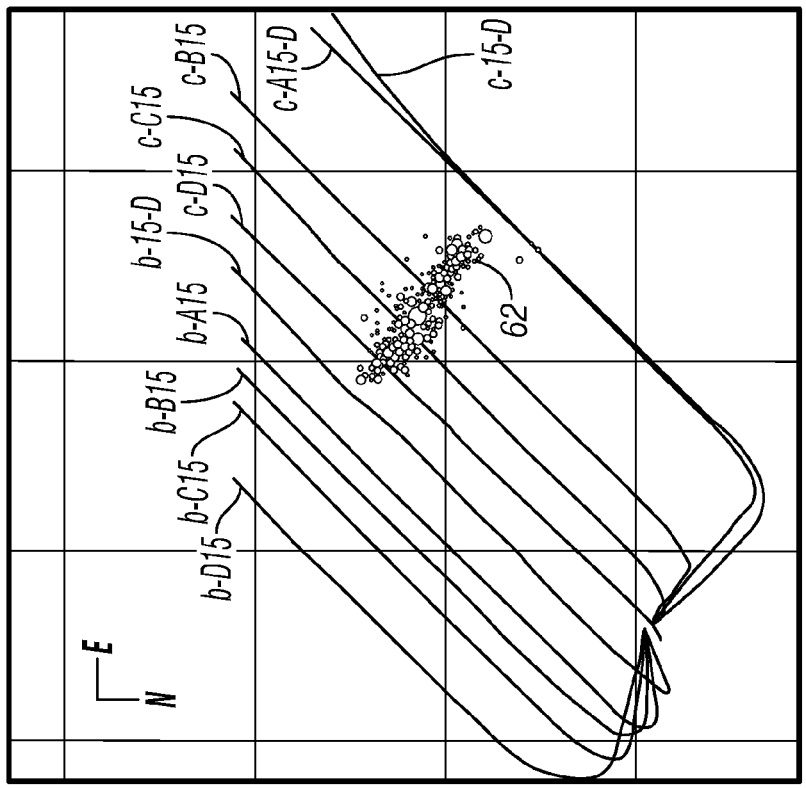

After eliminating hypocenters associated with tectonic features or activity, a highest value of k representative of hydraulic fracturing of the formation may be identified. A graph similar to that shown in FIG. 5 is shown in FIG. 7, wherein the highest value of k for all fracture treatment stages is determined. The highest value of k is shown at 60 in FIG. 7. FIGS. 8A and 8B show hypocenters on a plan view plot and vertical section plot, respectively, of hypocenters (shown at 62) not associated with tectonic features. The hypocenters in FIGS. 8A and 8B may be reasonably inferred to be related only to hydraulic fracturing.

Figure 9:
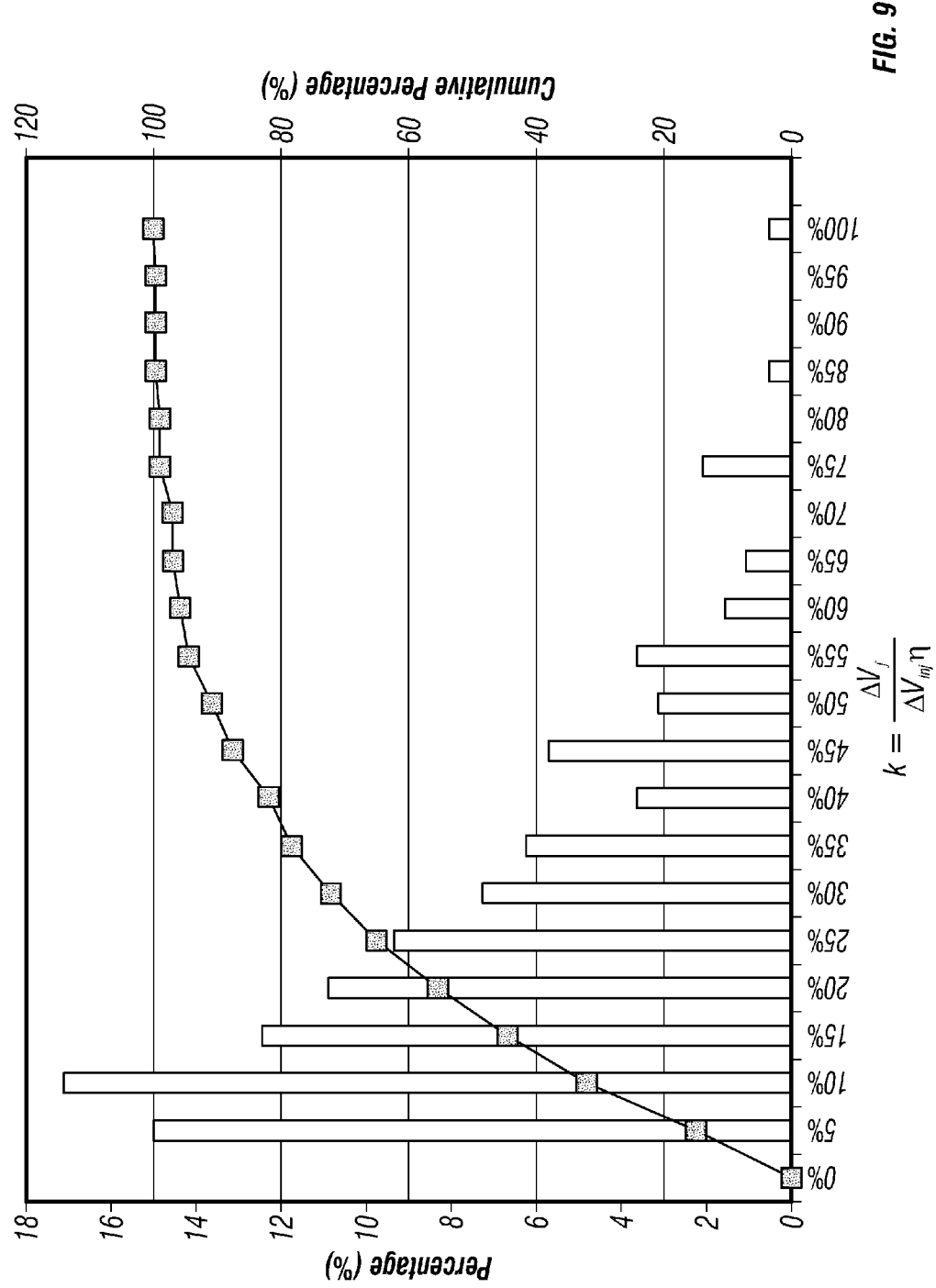
FIG. 9 shows a graph of individual occurrences and cumulative occurrences of scaling factors in various stages of a fracture treatment.

FIG. 9 shows a plot of all k values not associated with tectonic features or activity both with reference to the number of individual occurrences (left scale) and cumulatively (right scale).

Referring once again to FIG. 2, at 52, the highest value of k selected as explained above is applied to the displacements of each fracture in each and every stage of the fracture treatment, wherein the displacement for each fracture is raised to the 4/5 power. The explanation for raising the displacement value to the 4/5 power is shown in FIG. 3. Once new displacements for all fractures are calculated, at 54 in FIG. 2, new fracture dimensions are calculated for each fracture as shown at 42 in FIG. 2. After the new fracture dimensions are calculated, the total calculated fracture volume may be expected to match the pumped fracture fluid volume times the fluid efficiency, that is, as if k in Eq. (4) were equal to unity.

Figure 10:
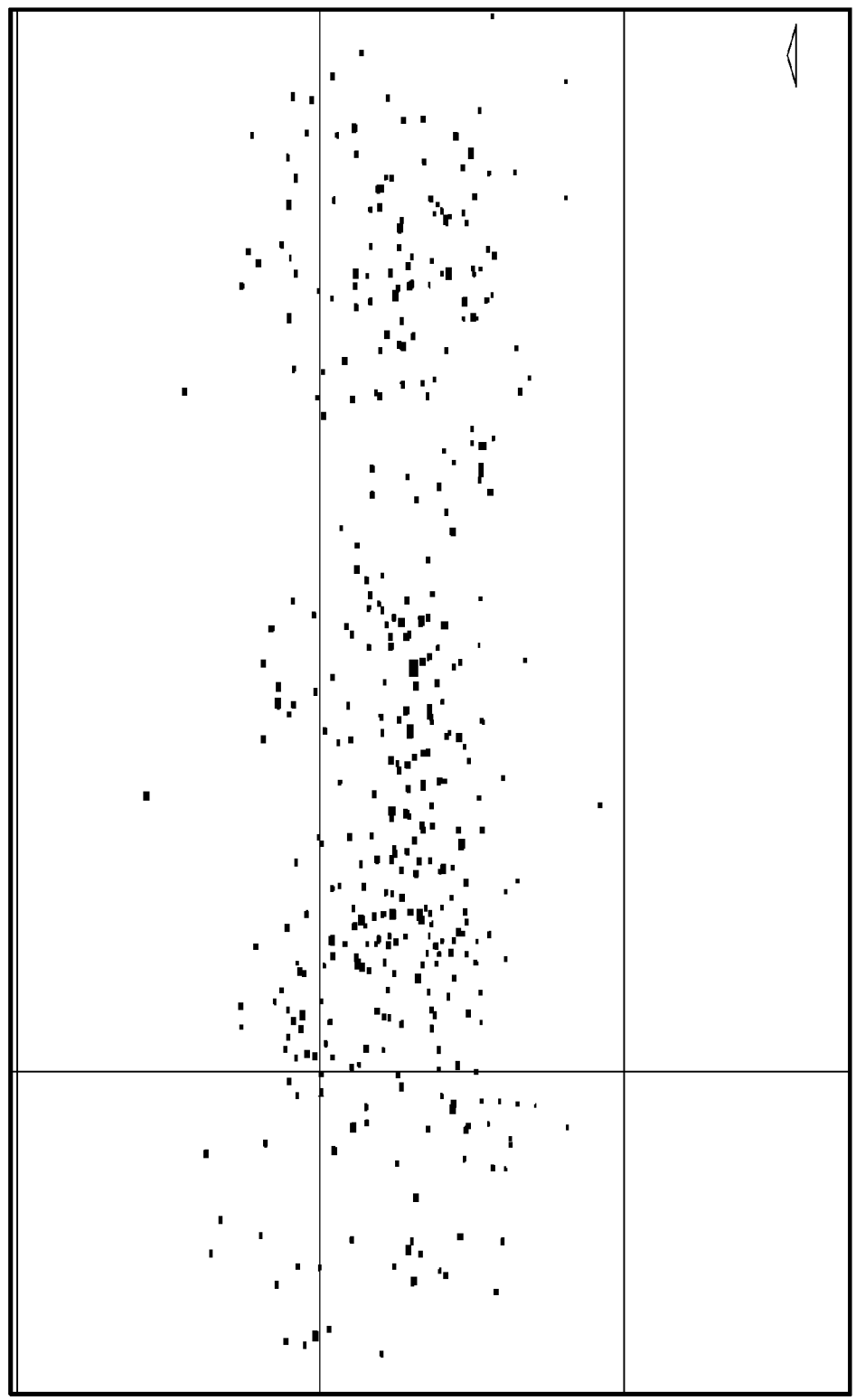
FIG. 10 shows a plan view of a fracture network with dimensions determined only from seismic moment.
Figure 11:
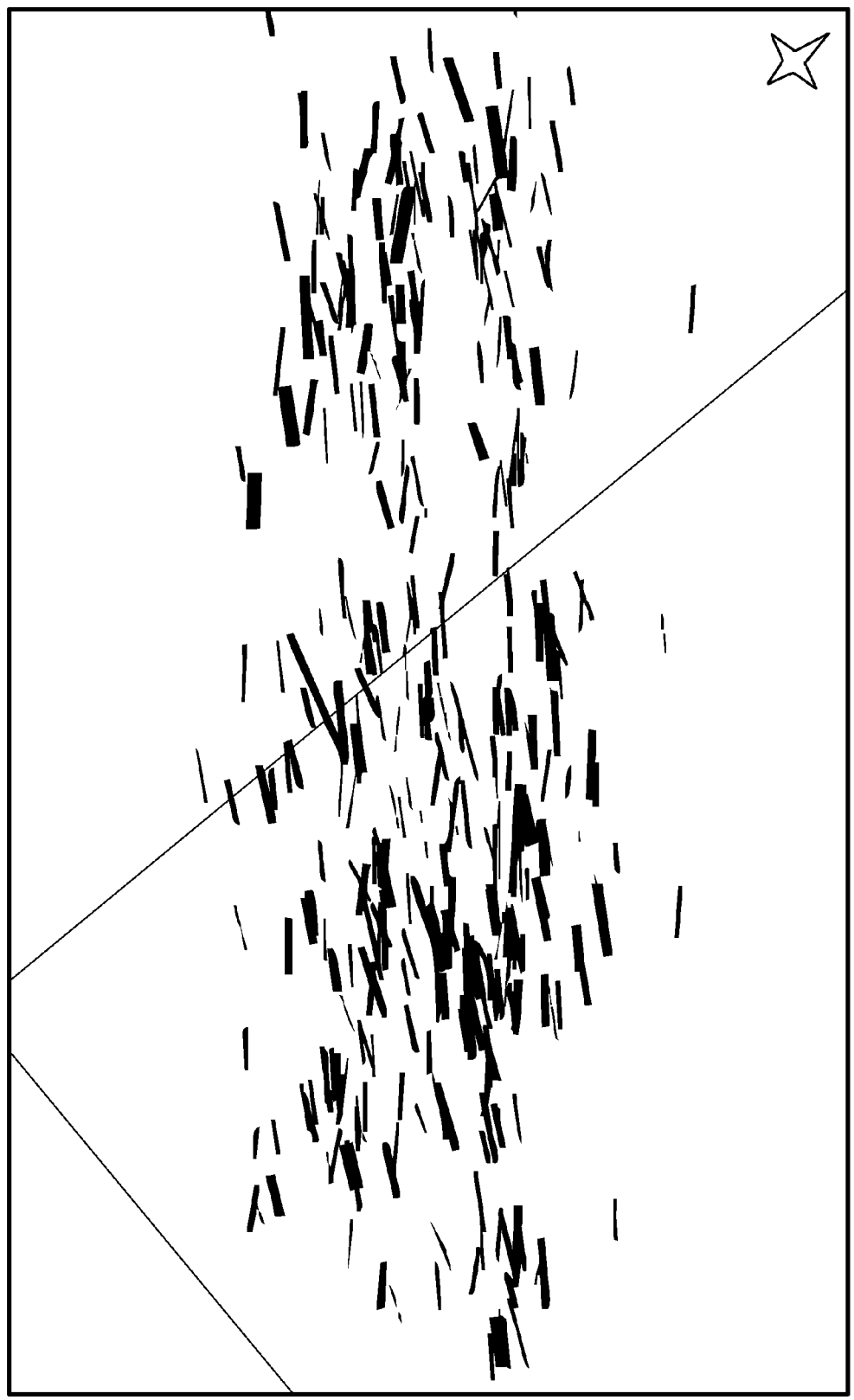
FIG. 11 shows a plan view of the fracture network of FIG. 10 wherein dimensions are scaled according to the example process explained with reference to FIG. 2.

FIGS. 10 and 11 show, respectively, plan views of a dimensionally unscaled determined fracture network calculated only from seismic moment and rock rigidity, and with a dimensionally scaled fracture using the process explained with reference to FIG. 2.

Figure 12:
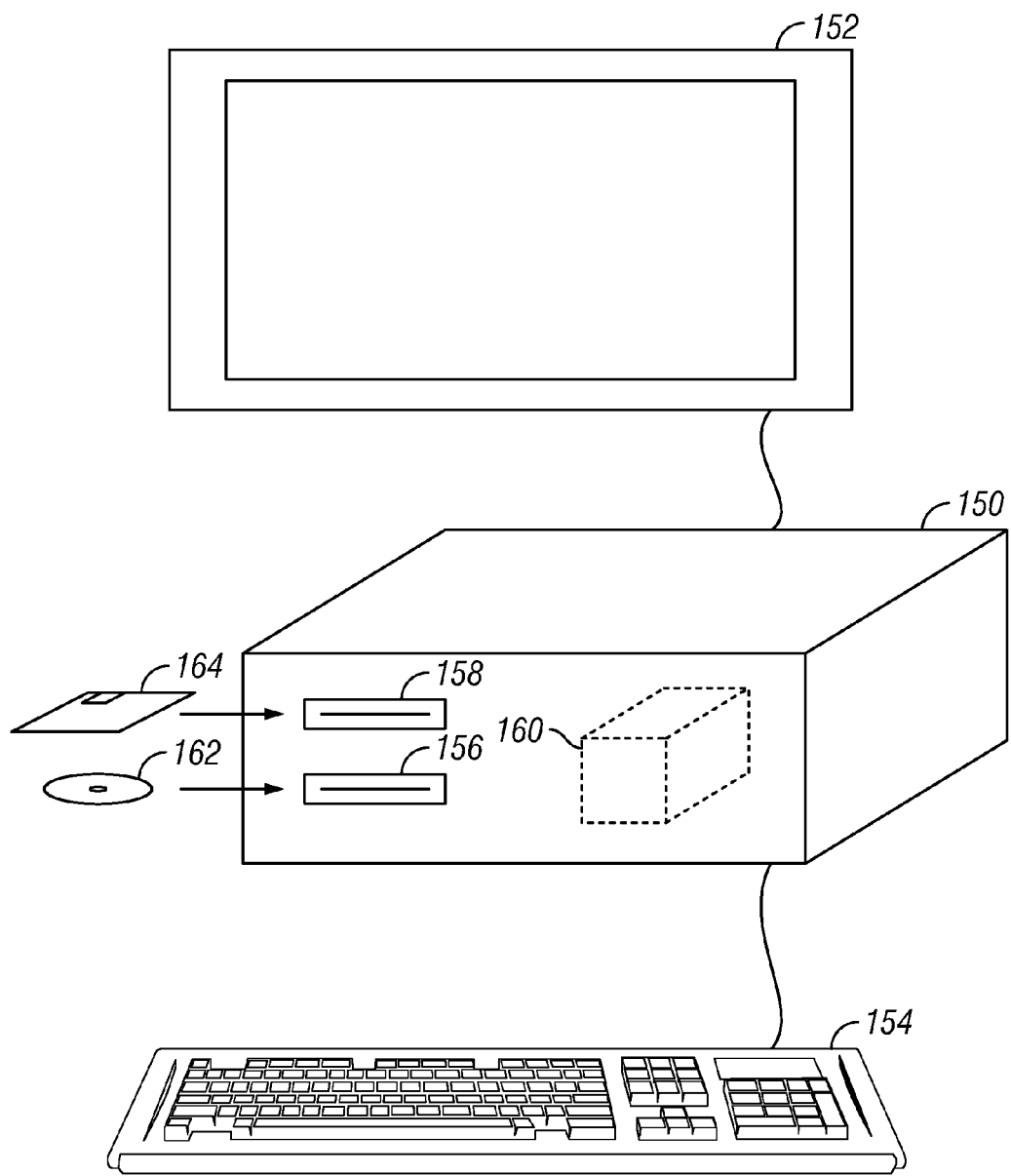
FIG. 12 shows an example computer system that may be used to perform a method according to the present disclosure.

Referring to FIG. 12, the foregoing process as explained with reference to FIGS. 1-6, can be embodied in computer-readable code. The code can be stored on a computer readable medium, such as solid state memory card 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. According to this aspect of the invention, the computer readable medium includes logic operable to cause the computer to execute acts as set forth above and explained with respect to the previous figures. The computer, as explained above, may be in the recording unit (10 in FIG. 1) or may be any other computer.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a volume of a discrete fracture network, comprising:
   detecting seismic signals deployed over an area of the subsurface to be evaluated during pumping of hydraulic fracturing fluid into at least one wellbore drilled through the area;
   in a computer, determining a hypocenter of each fracture induced by the pumping of the fracture fluid using the detected seismic signals;
   in the computer, determining a facture network using the determined hypocenters and seismic moments determined from the detected seismic signals, the determining a fracture network comprising determining a fracture volume associated with each hypocenter using the determined seismic moments;
   in the computer, determining a maximum value of a scaling factor based on a subset of the hypocenters having a highest cumulative seismic moment, the scaling factor determined by relating a pumped volume of the fracturing fluid with respect to the determined fracture volumes;
   in the computer, scaling dimensions of each fracture using the maximum value of the scaling factor; and
   in the computer, recalculating the fracture volumes using the scaled dimensions.

2. The method of claim 1 wherein the maximum value of the scaling factor is selected to exclude values related to tectonic features in the subsurface.

3. The method of claim 1 wherein the scaling factor is selected such that the pumped volume of fracturing fluid multiplied by a fluid efficiency factor substantially equals the total fracture volumes.

4. The method of claim 1 wherein a fracture area of each fracture is determined by a moment determined from detected seismic signal amplitudes.

5. The method of claim 1 wherein the scaling factor is determined by relating a pumped volume of fracture fluid multiplied by a fluid efficiency to the determined fracture volumes.

6. A method for determining a volume of a discrete fracture network, comprising:
   conducting to a computer recorded seismic signals detected by a plurality of seismic sensors deployed over an area of the subsurface to be evaluated during pumping of hydraulic fracturing fluid into at least one wellbore drilled through the area;
   in the computer, determining a hypocenter of each fracture induced by the pumping of the fracture fluid using the detected seismic signals;
   in the computer, determining a facture network using the determined hypocenters and seismic moments determined from the detected seismic signals, the determining a fracture network comprising determining a fracture volume associated with each hypocenter using the determined seismic moments;
   in the computer, determining a maximum value of a scaling factor based on a subset of the hypocenters having a highest cumulative seismic moment, the scaling factor determined by relating a pumped volume of the fracturing fluid with respect to the determined fracture volumes;
   in the computer, scaling dimensions of each fracture using the maximum value of the scaling factor; and
   in the computer, recalculating the fracture volumes using the scaled dimensions, wherein the maximum value of the scaling factor is selected to exclude values related to tectonic features in the subsurface.

7. The method of claim 6 wherein the scaling factor is selected such that the pumped volume of fracturing fluid multiplied by a fluid efficiency factor substantially equals the total fracture volumes.

8. The method of claim 6 wherein a fracture area of each fracture is determined by a moment determined from detected seismic signal amplitudes.

9. The method of claim 6 wherein the scaling factor is determined by relating a pumped volume of fracture fluid multiplied by a fluid efficiency to the determined fracture volumes.

10. A method for determining a volume of a discrete fracture network, comprising:
    conducting to a computer recorded seismic signals detected by a plurality of seismic sensors deployed over an area of the subsurface to be evaluated during pumping of hydraulic fracturing fluid into at least one wellbore drilled through the area;
    in the computer, determining a hypocenter of each fracture induced by the pumping of the fracture fluid using the detected seismic signals;
    in the computer, determining a facture network using the determined hypocenters and seismic moments determined from the detected seismic signals, the determining a fracture network comprising determining a fracture volume associated with each hypocenter using the determined seismic moments;
    in the computer, determining a maximum value of a scaling factor based on a subset of the hypocenters having a highest cumulative seismic moment, the scaling factor determined by relating a pumped volume of the fracturing fluid with respect to the determined fracture volumes;
    in the computer, scaling dimensions of each fracture using the maximum value of the scaling factor; and
    in the computer, recalculating the fracture volumes using the scaled dimensions, wherein the scaling factor is determined by relating a pumped volume of fracture fluid multiplied by a fluid efficiency to the determined fracture volumes.

11. The method of claim 10 wherein the maximum value of the scaling factor is selected to exclude values related to tectonic features in the subsurface.

12. The method of claim 10 wherein the scaling factor is selected such that the pumped volume of fracturing fluid multiplied by a fluid efficiency factor substantially equals the total fracture volumes.

13. The method of claim 10 wherein a fracture area of each fracture is determined by a moment determined from detected seismic signal amplitudes.

* * * * *